Feb. 28, 1956    J. E. CONYERS    2,736,128
INSECT EXTERMINATOR
Filed May 25, 1954

John E. Conyers
INVENTOR.

BY

United States Patent Office 2,736,128
Patented Feb. 28, 1956

2,736,128

INSECT EXTERMINATOR

John E. Conyers, Hialeah, Fla.

Application May 25, 1954, Serial No. 432,121

3 Claims. (Cl. 43—131)

The present invention relates to new and useful improvements in insect exterminators for use in holding either liquid, granulated or solid bait in an exposed position and safe from the reach of children or household pets.

An important object of the invention is to provide a bait holder of knockdown construction for convenient packaging and merchandising and which may be easily and quickly set up and attached in a desired location.

Another object is to construct the bait holder of inexpensive material and including an easily removable and replaceable bait cup.

A further object is to provide a device of this character of simple and practical construction, which is efficient and dependable in use, neat and attractive in appearance, and otherwise well adapted for the purpose for which the same is intended.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
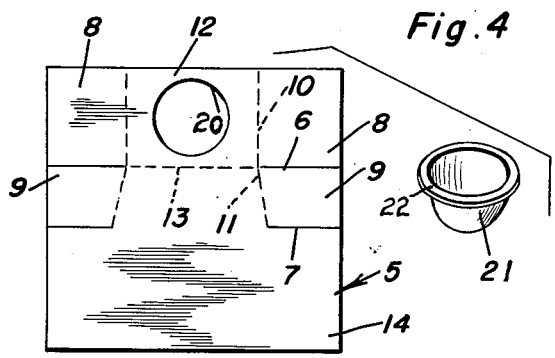
Figure 4 is a group view of the blank from which the bait holder is formed, and the bait cup.

Referring now to the drawing in detail, wherein for the purpose of illustration I have disclosed a preferred embodiment of my invention, the numeral 5 in Figure 4 designates a square sheet or blank of cardboard or other suitable inexpensive material having two of its corner portions marked or otherwise provided with parallel score lines 6 and 7 to form a pair of tabs 8 and 9 at each side edge of the blank foldable along lines 10 and 11 respectively. Tabs 8 are foldable at the side portions of a central tab 12 which is also foldable along a line 13. The remaining portion of blank 5 constitutes a flat attaching body 14.

In erecting the bait holder, the central tab 12 is folded outwardly at right angles to one surface of the body 14 of the blank to form a shelf 15 and tabs 8 are folded downwardly at the side edges of the shelf and are secured in confronting relation to the tabs 9 by staples 16, after the last named tabs have also been folded outwardly at right angles to the body 14 under the shelf.

Figure 1:
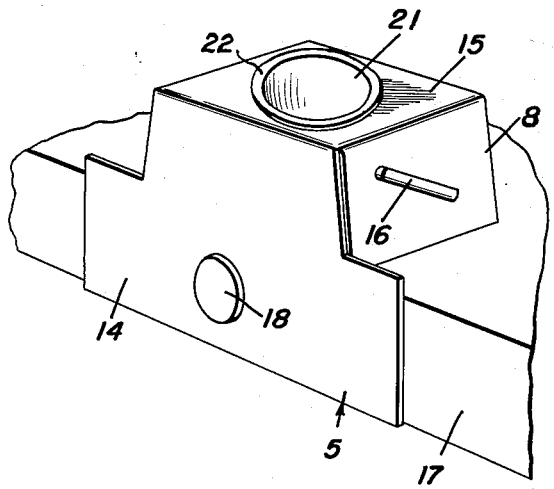
Figures 1 and 2 are front and rear perspective views showing the bait holder erected and attached to different types of supporting structures.
Figure 2:
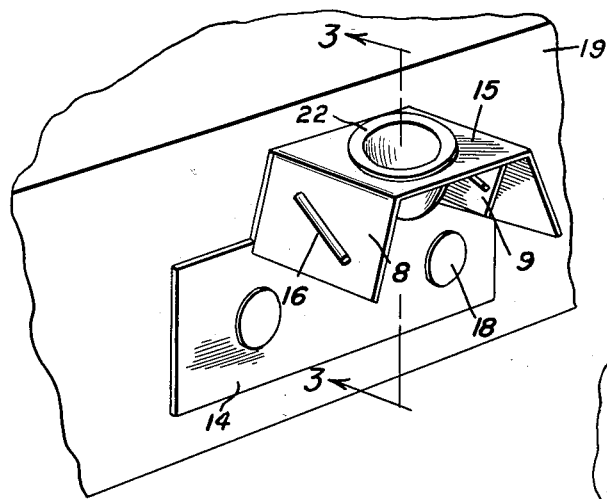
Figure 3:
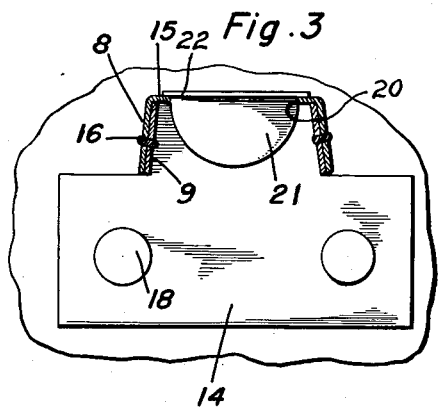
Figure 3 is a vertical sectional view taken on a line 3—3 of Figure 2.

The body 14 may then be attached to the front edge of a shelf 17 by thumb tacks 18, as shown in Figure 1, or to the vertical surface of any suitable supporting structure, as shown at 19 in Figure 2.

The shelf 15 is formed with an opening 20 to receive a bait cup 21 which is constructed with an outwardly projecting flange 22 to support the cup in the opening. Liquid, solid or granulated insect poison may be placed in the bait cup and is thus accessible to insects.

It is not desired to limit the invention to the exact construction shown and described, and accordingly all suitable modifications and equivalents may be resorted to, falling within the scope of the appended claims.

What is claimed as new is as follows:

1. An insect exterminator comprising a sheet of bendable material adapted for attaching to the vertical surface of a supporting structure, said sheet including a pair of bendable tabs at each side edge portion of the sheet, a central bendable tab between said pairs of tabs and having an opening therein, said central tab forming a shelf projecting at right angles to the surface of the sheet, means securing the adjacent side tabs in confronting relation to each other below the shelf, and a bait cup removably supported in the opening of the shelf.

2. An insect exterminator comprising a flat body adapted for attaching to the vertical surface of a supporting structure, a shelf at the upper edge of the body and having an opening therein, a bait cup removably supported in the opening, and bendable pairs of tabs united respectively with the body and with the shelf and secured in confronting relation to each other below each end of the shelf to reinforce the latter.

3. An insect exterminator of knockdown construction comprising a blank of foldable material, adapted for attaching to a supporting structure and having a free edge portion, said blank including a foldable shelf at the free edge portion of the blank and having an opening therein, reinforcing means connecting the shelf to the attached portion of the blank and extending downwardly from at least one marginal portion of the shelf and a bait cup removably supported in the opening substantially flush with the shelf.

References Cited in the file of this patent

UNITED STATES PATENTS

| | | |
|---|---|---|
| D. 5,369 | Jackson | Nov. 21, 1871 |
| D. 105,450 | Clifton | July 27, 1937 |
| 1,108,043 | Weder et al. | Aug. 18, 1914 |
| 1,404,958 | Hobbs | Jan. 31, 1922 |
| 1,831,593 | Garvey | Nov. 10, 1931 |
| 1,915,958 | Skirrow | June 27, 1933 |